Dec. 26, 1961  E. MAYER  3,014,742
SLIDE RING PACKING
Filed Feb. 1, 1960
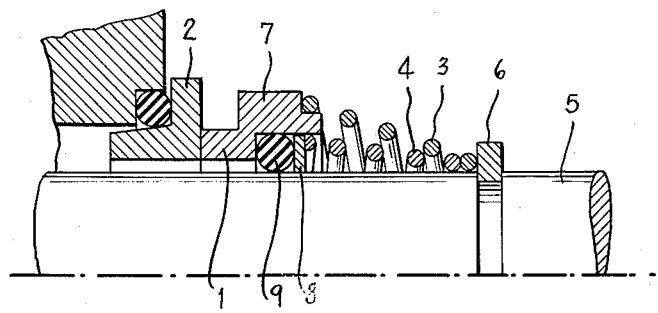
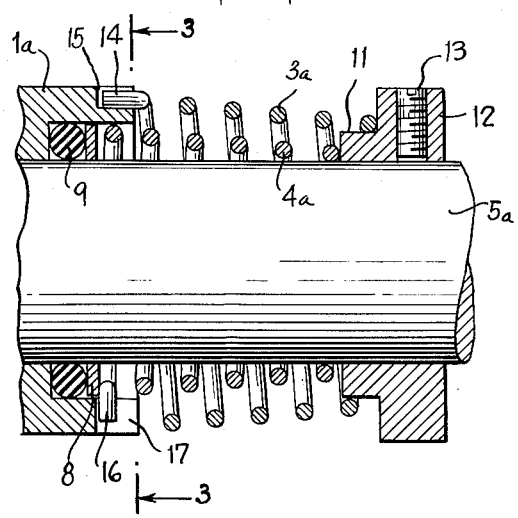
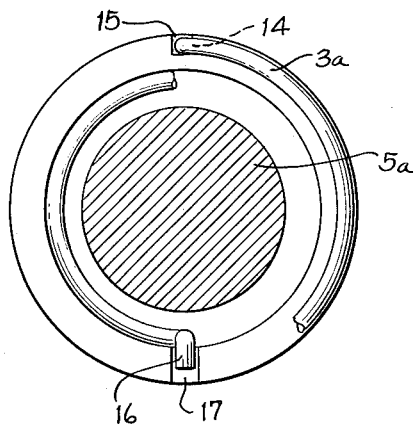
INVENTOR:
EHRHARD MAYER
BY Robert Henderson
ATTORNEY 3,014,742
SLIDE RING PACKING
Ehrhard Mayer, Palmyra, N.Y., assignor to Garlock Inc., a corporation of New York
Filed Feb. 1, 1960, Ser. No. 5,741
Claims priority, application Germany Mar. 4, 1959
3 Claims. (Cl. 286—11.15)

This invention relates to a slide ring packing which revolves with a shaft and automatically adjusts itself to operate in either direction of rotation.

Self-adjusting slide ring packings are known in which the slide ring is imbedded in a metal housing and held against its backing surface by a coil spring. To transmit torque from the shaft to the slide ring, the coil spring has been tapered and its end, distal from the slide ring, wound so close that the spring embraced the shaft with tension. Thus, the torque was transmitted from the shaft to the slide ring through the spring without special aids. However, such known designs are limited in direction of rotation.

According to this invention, it is proposed that the slide ring be held against its backing surface by two springs, wound opposite-hand. The distal ends of the springs engage the shaft, or a sleeve mounted on the shaft, in otherwise known manner. This dependably avoids slip between the spring and the shaft upon change in direction of rotation. Whether the springs are conical or cylindrical is not essential to this invention. To avoid weakening of the slide ring housing, especially if the latter is of synthetic material, the recesses serving to receive the spring ends are advantageously set 180° apart in said housing. This further serves to keep the slide ring under uniform axial loads.

In the accompanying drawing:

FIG. 1 is an axial sectional view of a first preferred embodiment of this invention.

FIG. 2 is an axial sectional view of a second embodiment of the invention.

FIG. 3 is a transverse sectional view substantially on the line 3—3 of FIG. 2.

In the first embodiment, slide ring 1 is in sliding sealing contact with backing ring 2. Tapered, opposite-handwound springs 3, 4 encircle shaft 5 and grip the latter tightly with their smallest turns which are at their ends distal from the slide ring; and said springs are compressed axially between snap ring 6 and a back part of housing portion 7 of the slide ring. While one end of spring 3 rests exclusively against housing portion 7, the corresponding end of spring 4 presses through washer 8 upon round rubber ring 9, providing a static seal between shaft 5 and housing portion 7. Thus, the compressed condition of the springs maintains the slide ring in sliding sealing engagement with the backing ring; and the engagement of the opposite ends of the two counter-wound springs is such as to constitute the springs as a drive to cause the slide ring to turn with the shaft in either direction.

The second embodiment differs from the first embodiment chiefly in the disposition of the ends of the springs. Thus, the back end of spring 3a frictionally and drivingly engages tightly within a circular rabbet 11 of a rigid ring 12 which is immovably secured upon shaft 5a by a set screw 13, while the front end of the same spring is formed with an axially extending finger 14 which seats within a recess 15 formed in the back end of slide ring 1a, thereby causing the latter to be turned with the shaft, through said spring. The back end of spring 4a frictionally and drivingly grips the shaft tightly, while the front end of the same spring is formed with a radially extending finger 16 which seats within a recess 17 formed in the back end of slide ring 1a, 180° removed from recess 15 and bears against washer 8. As the springs 3a and 4a are counter-wound, they constitute means for rotating the slide ring 1a positively in either direction. The two springs, of course, preferably press approximately equally against diametrically opposite points on the slide ring 1a, thereby imposing a substantially uniform or non-tilting spring pressure upon said ring.

I claim:

1. A slide ring packing for effecting a seal between a rotary shaft and an annular machine-casing portion which is coaxial with the shaft, said packing comprising a slide ring encircling the shaft and backing slidably and sealingly against an annular surface of the casing portion, a packing ring between and in sealing relation to said slide ring and shaft, two axially compressed counter-wound coil springs encircling the shaft and having corresponding ends engaging a back part of said slide ring to hold the latter yieldably against said annular surface, said corresponding ends being in rotary driving relation to said slide ring, and opposite corresponding ends of said springs being in frictional, rotary, continuous, driving relation to cylindrical surfaces which face in the same radial direction as each other and are constrained to turn with said shaft, whereby to transmit rotation from the shaft to said slide ring in either direction.

2. A slide ring packing according to claim 1, the front ends of said springs being engaged within diametrically opposite recesses in said slide ring.

3. A slide ring packing according to claim 1, further including a rigid ring adapted for affixation upon the shaft, and the back end of one of said springs being drivingly backed into a rabbet in said rigid ring, and the back end of the other of said springs being backed against an axially facing surface of said rigid ring.

References Cited in the file of this patent
UNITED STATES PATENTS

| | | |
|---|---|---|
| 431,124 | Rae | July 1, 1890 |
| 1,472,782 | Barber | Nov. 6, 1923 |
| 2,158,297 | Newill | May 16, 1939 |
| 2,332,859 | Kreissig et al. | Oct. 26, 1943 |
| 2,411,509 | Endebak | Nov. 26, 1946 |
| 2,430,426 | Katcher | Nov. 4, 1947 |